United States Patent [19]

Colla

[11] Patent Number: 5,785,046
[45] Date of Patent: Jul. 28, 1998

[54] PORTABLE FIRE PIT

[76] Inventor: Gregory D. Colla, 879-D S. McGlincey La., Campbell, Calif. 95008

[21] Appl. No.: 694,519

[22] Filed: Aug. 9, 1996

[51] Int. Cl.[6] ............................................. F24C 1/16
[52] U.S. Cl. ........................ 126/9 R; 126/25 R; 126/151
[58] Field of Search ............................ 126/9 R, 25 R, 126/151, 153, 148, 9 A, 9 B, 25 B, 305; 312/259, 258

[56] References Cited

U.S. PATENT DOCUMENTS

| D. 258,259 | 2/1981 | Lindholm | D7/107 |
|---|---|---|---|
| D. 273,264 | 4/1984 | Elliston | D7/332 |
| D. 293,191 | 12/1987 | Stephen et al. | D7/332 |
| D. 301,106 | 5/1989 | Oliphant | D7/333 |
| 2,244,935 | 6/1941 | Binger | 126/9 R |
| 2,369,965 | 2/1945 | Harris | 126/151 |
| 2,576,750 | 11/1951 | Clark | 312/259 |
| 2,742,033 | 4/1956 | Bramming | 126/9 R |
| 3,421,493 | 1/1969 | Miller | 126/25 |
| 4,455,992 | 6/1984 | Hsiao | 126/9 R |
| 4,624,238 | 11/1986 | Hait | 126/9 R |
| 4,794,906 | 1/1989 | Longley, Jr. | 126/9 R |
| 4,878,476 | 11/1989 | Oliphant | 126/9 R |
| 4,971,045 | 11/1990 | Probst | 126/65 |

*Primary Examiner*—James C. Yeung
*Attorney, Agent, or Firm*—John J. Leavitt

[57] ABSTRACT

The portable fire pit structure includes two foraminous front and rear wall panels that constitute shallow pans defined by peripheral flanges to the mutually facing edge portions of which flanges are attached opposed foldable left and right foraminous wall panel portions medianly hinged whereby the front and rear wall panels may be moved toward each other while the hinged foldable foraminous wall panels fold inwardly to permit collapse of the structure into a compact unit for storage and/or portability. An ash pan is provided insertable into the portable fire pit when extended for use to catch and retain ashes generated from burning wood, for instance, and brackets are provided for selectively retaining a fuel support grate spaced above the ash pan. A detachable grill structure on which food to be cooked may be supported during a cooking operation is also provided. Since the burning of any fuel in an enclosed portable structure such as the one described generates a considerable amount of heat, a heat deflector assembly is provided within the portable fire pit structure for absorbing part of the intense heat generated at the core of the fire, thus shielding the outer foraminous walls of the fire pit from such intense heat.

10 Claims, 5 Drawing Sheets

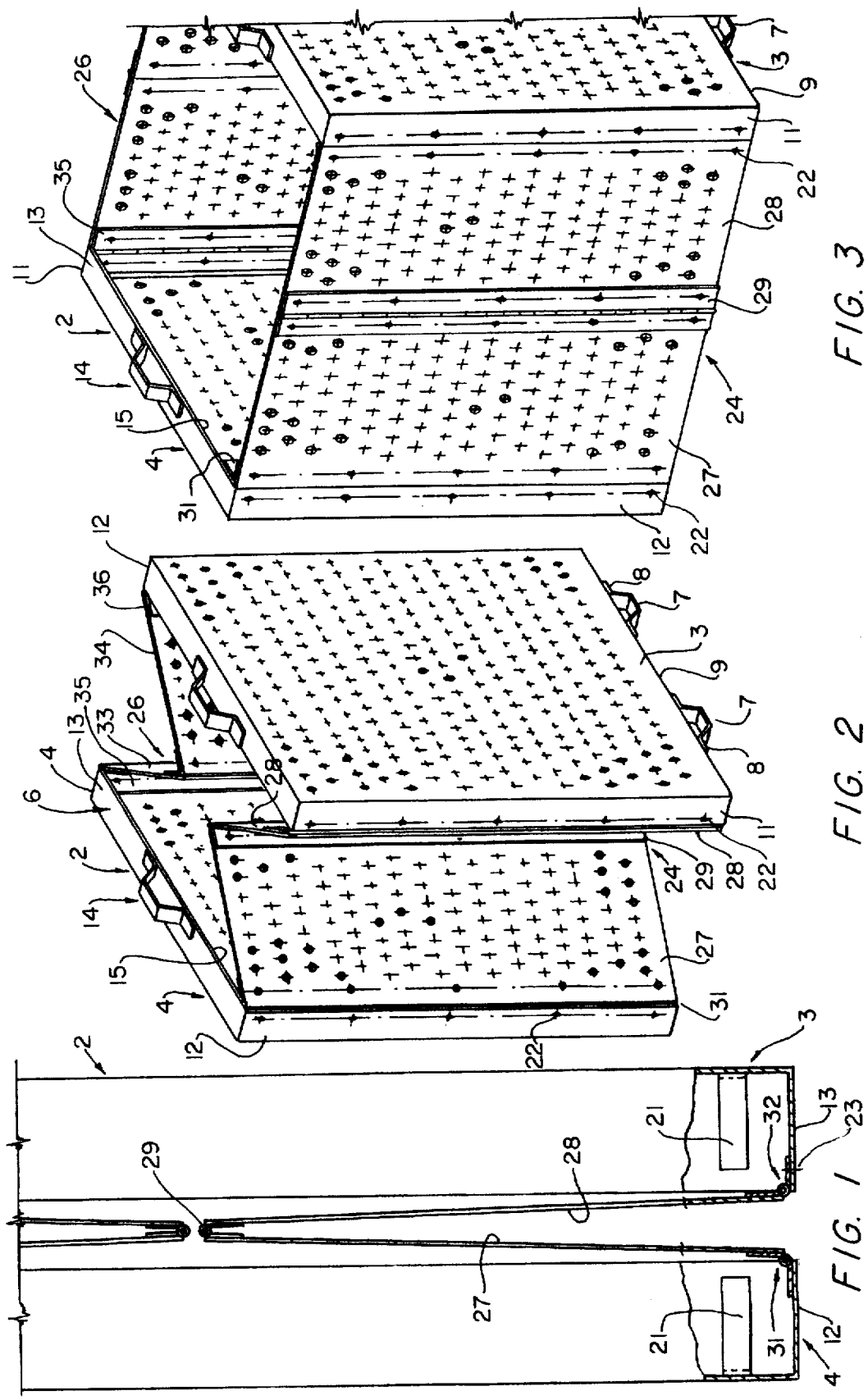

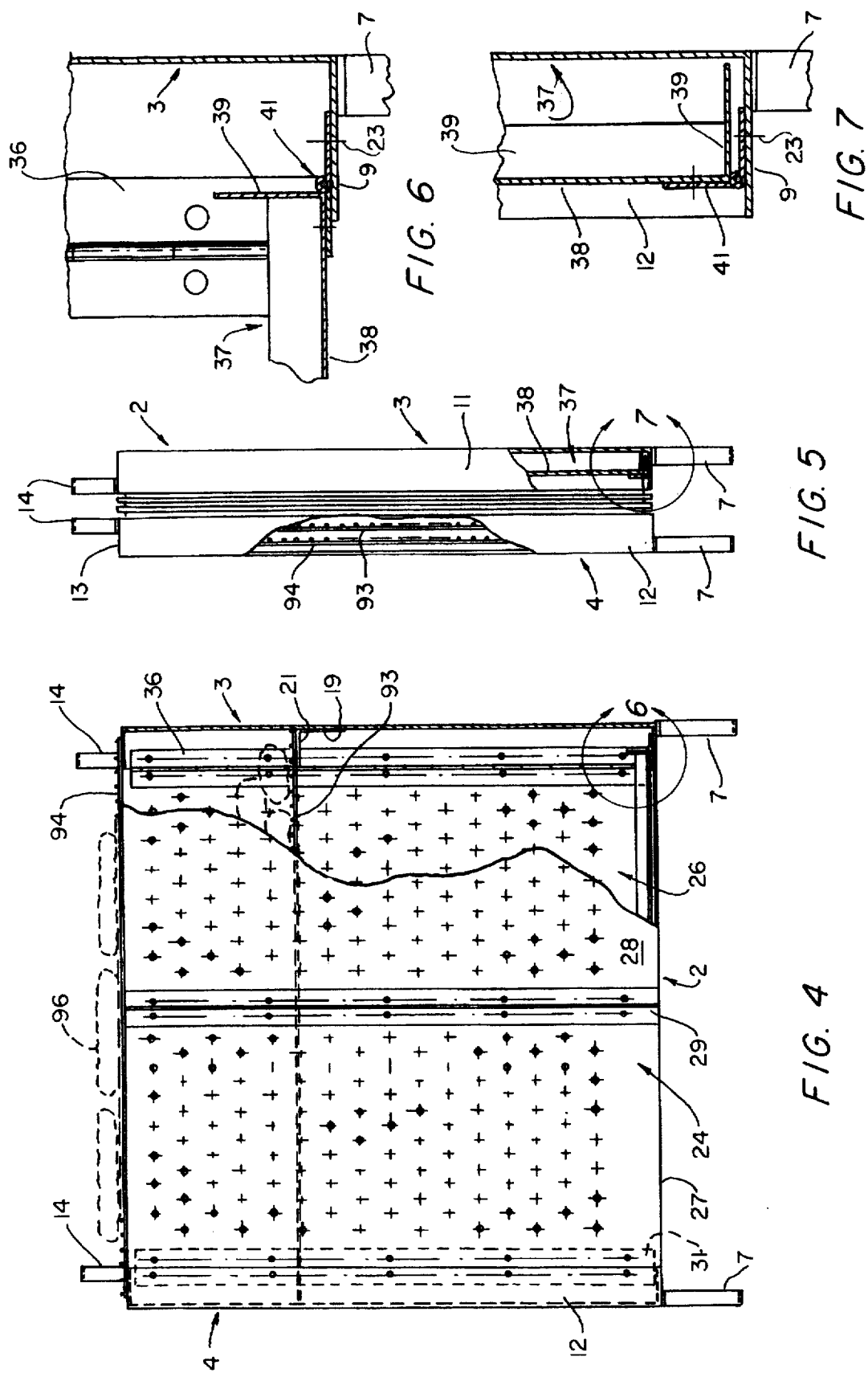

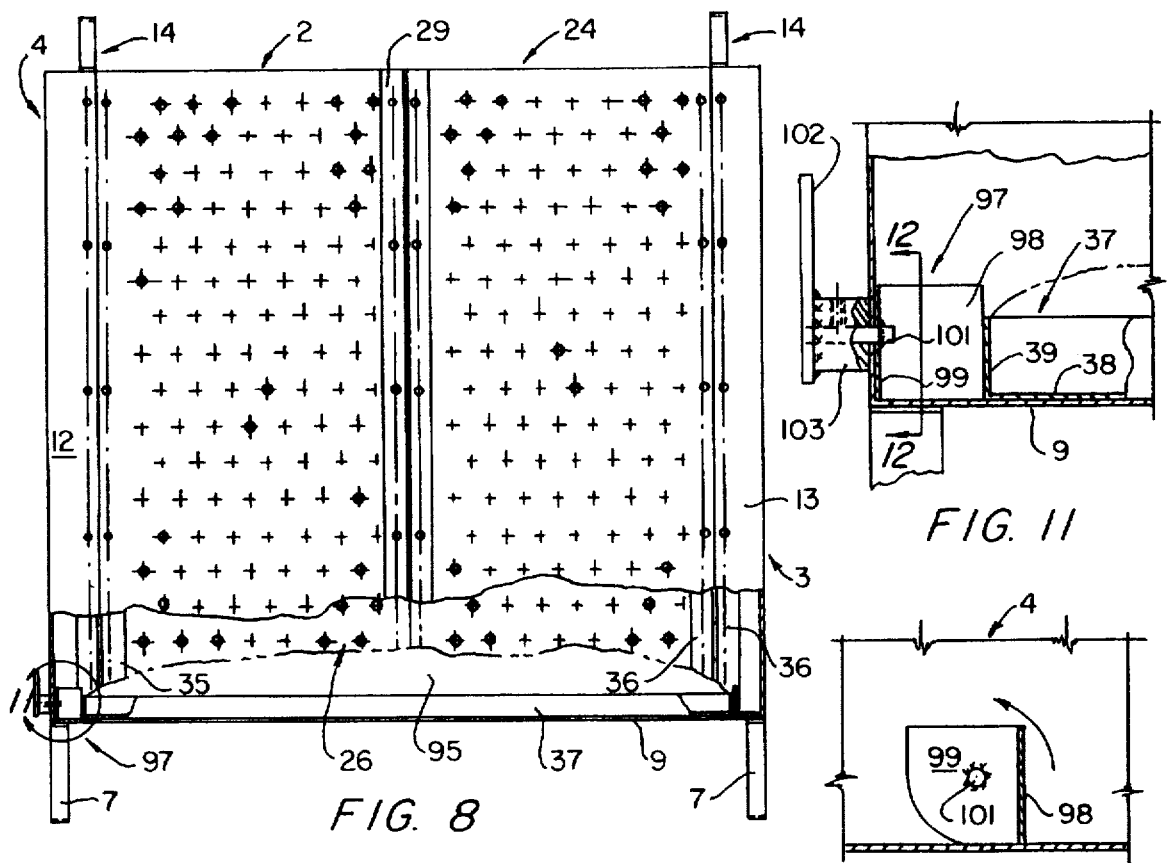
FIG. 8
FIG. 11
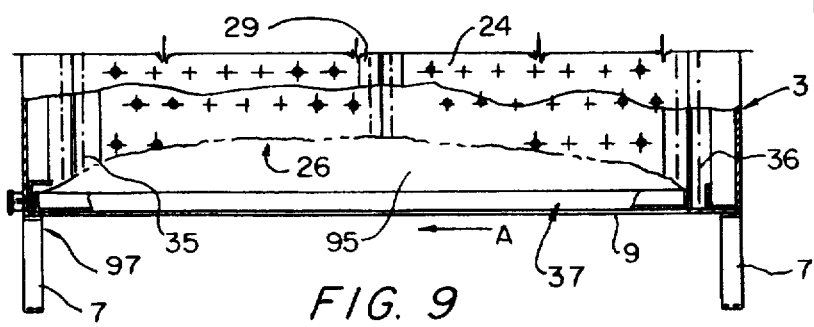
FIG. 9
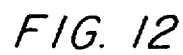
FIG. 12
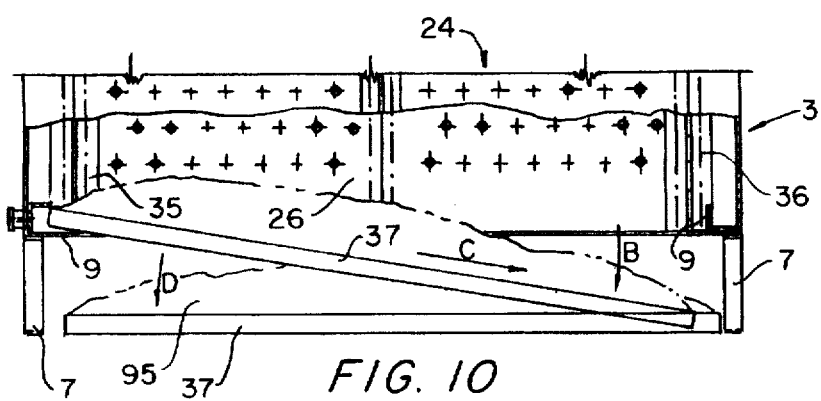
FIG. 10

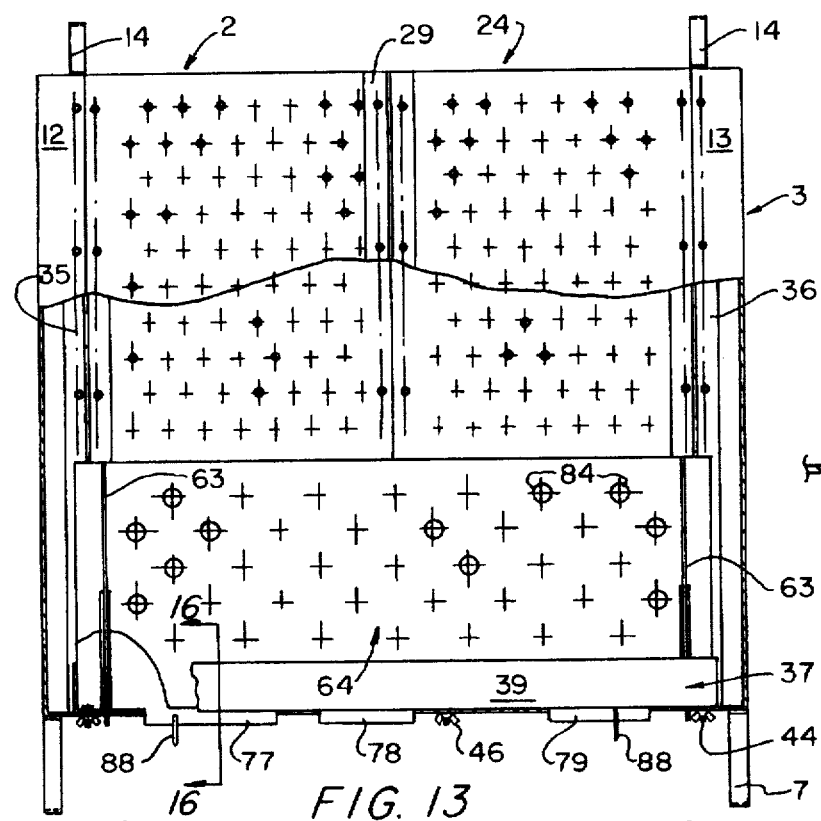
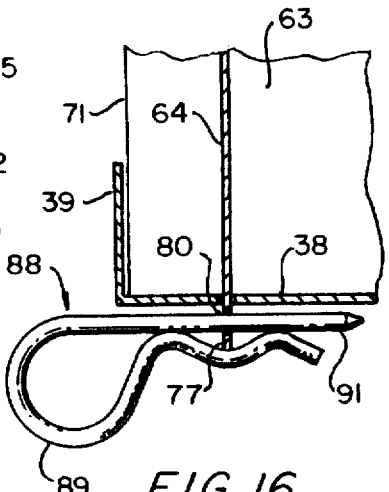
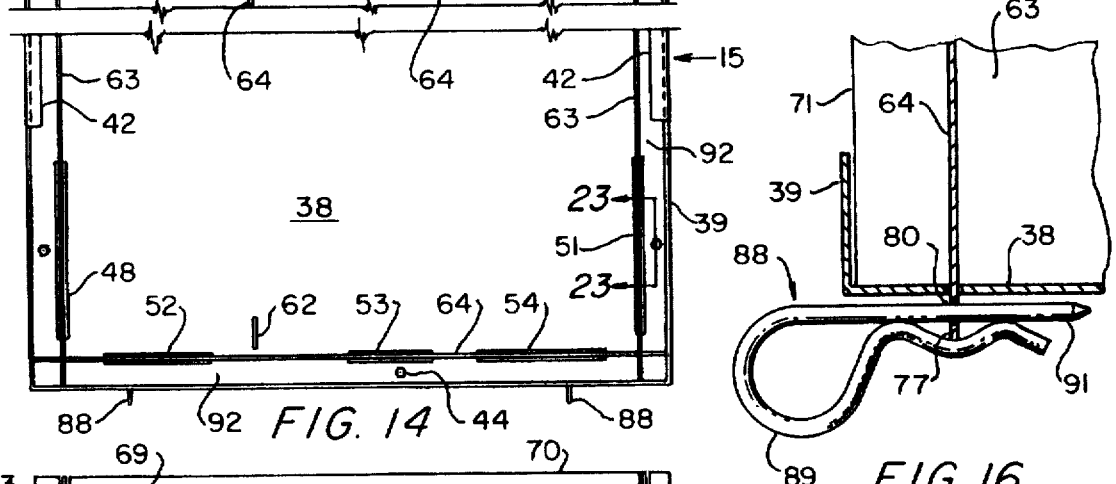

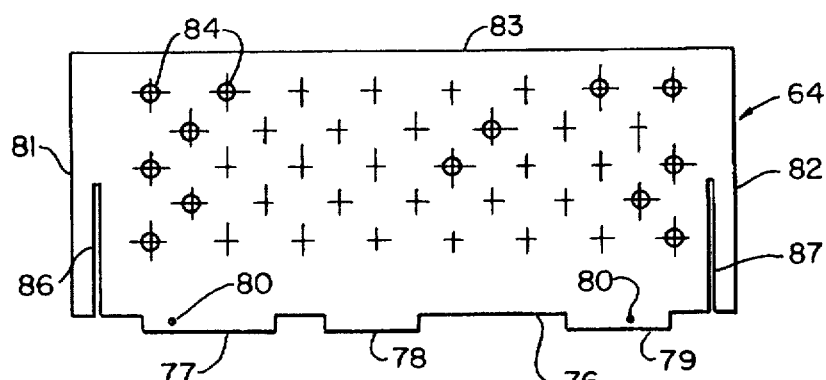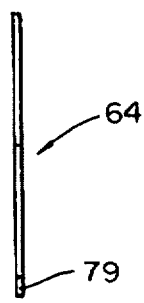
FIG. 17  FIG. 18
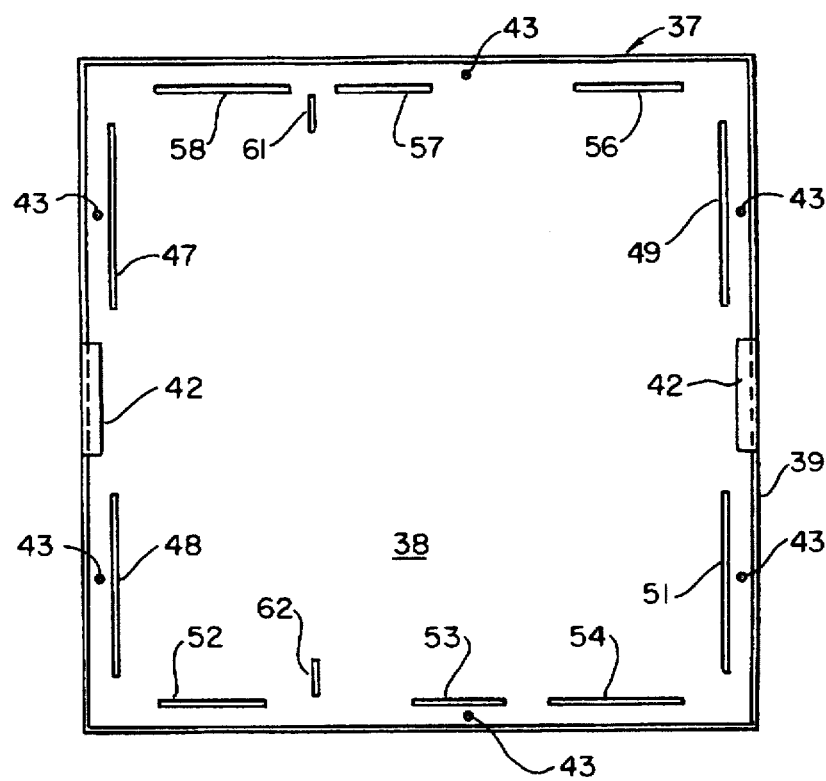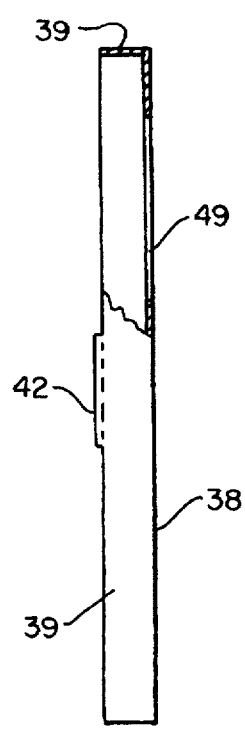
FIG. 19  FIG. 20
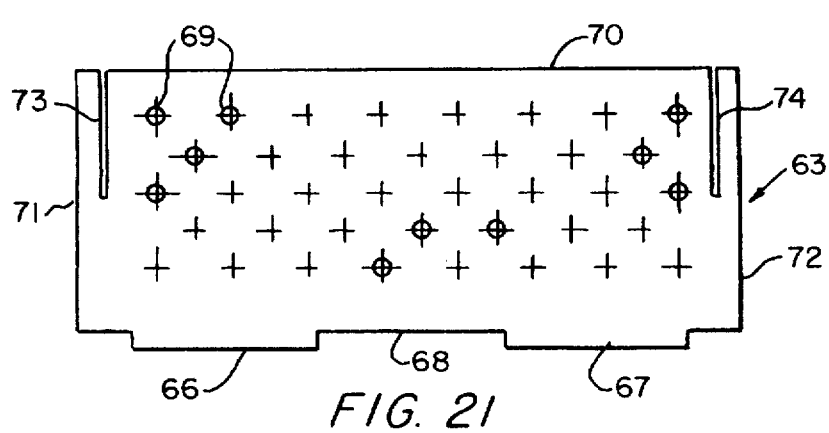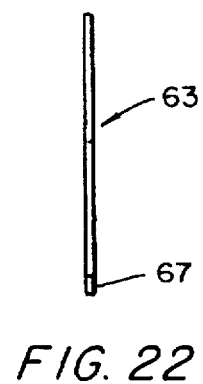
FIG. 21  FIG. 22

S,785,046

1

PORTABLE FIRE PIT

BACKGROUND OF THE INVENTION

1. Field of the Invention

This invention relates to fire pits, and particularly to a portable fire pit that may be extended for use and collapsed for storage and/or transport.

2. Description of the Prior Art

A preliminary patentability and novelty search has revealed the existence of the following patents.

| D-273,264 | D-293,191 | D-301,106 |
|-----------|-----------|-----------|
| 3,421,493 | 4,878,476 | 4,971,045 |
|           | D-258,259 |           |

U.S. Design Pat. Nos. 258,259 and 273,264 each disclose the concept of a fire pit that is perhaps portable, but is not collapsible. U.S. Design Pat. Nos. 293,191 and 301,106 each disclose a portable outdoor fireplace or portable grill, but again, neither appears to be collapsible. U.S. Pat. No. 4,878,476 relates to a portable barbecue grill assembly, but the structure illustrated does not appear to be collapsible. U.S. Pat. No. 3,421,493 discloses the concept of portability and collapsibility in a barbecue grill structure, but does not appear to be a structure that may be utilized merely as a fire pit about which people may congregate in a spirit of conviviality enhanced by the focal point of the fire pit and the flames contained therein. U.S. Pat. No. 4,971,045 discloses a portable, collapsible wood burning stove that is collapsible in the sense that it is disassemblable as opposed to being folded or collapsed into a compact structure when not in use.

Accordingly, one of the primary objects of the present invention is the provision of a portable fire pit that may be used as such as a focal point to provide warmth and a pleasant visual impression to those gathered about the fire pit when the fire pit is charged with a flammable material such as wood logs.

Another object of the invention is the provision of a portable fire pit that is foldably collapsible into a compact structure for storage purposes and/or transport in a vehicle.

Another object of the invention is the provision of a portable fire pit that is foldably collapsible or selectively expanded from a folded collapsed condition to form a barbecue grill.

Still another object of the invention is the provision of a portable fire pit that is constructed in such a way that it provides an aesthetic effect that is pleasant to view when in use and which functionally radiates heat when in use to warm those gathered about the portable fire pit.

A still further object of the invention is the provision of a portable fire pit that incorporates means for absorbing part of the concentrated heat at the core level of a fire so as to prevent buckling or warping of the foraminous sides of the portable fire pit.

Yet another object of the invention is the provision of means in conjunction with a portable fire pit enabling the fire pit to be extended for use, and foldably collapsed during disuse, which incorporates means for catching and containing ashes from a fire built therein, and which ash catching and containment means may be manipulated to discharge the ashes onto the ground or into an appropriate container when it is perceived that no "live" coals are present in the ash pile.

The invention possesses other objects and features of advantage, some of which, with the foregoing, will be apparent from the following description and the drawings. It is to be understood that the invention is not limited to the embodiment illustrated and described, since it may be embodied in various forms within the scope of the appended claims.

SUMMARY OF THE INVENTION

In terms of broad inclusion, the portable fire pit of the invention comprises a structure including two foraminous front and rear wall panels that constitute shallow pans defined by peripheral flanges to the mutually facing edge portions of which flanges are attached opposed foldable foraminous wall panel portions medianly hinged whereby the front and rear wall panels may be moved toward each other while the hinged attached foldable foraminous wall panels fold inwardly to permit collapse of the structure into a compact unit. Means are provided insertable into the portable fire pit when extended for use to catch and retain ashes generated from burning wood, for instance, and means are also provided for retaining a fuel support structure spaced above the ash collector or pan yet enables flame to rise and be visible through the foraminous side walls of the collapsible structure. Means are also provided for supporting a detachable grill structure on which food to be cooked may be supported during a cooking operation. Since the burning of any fuel in an enclosed portable structure such as the one described generates a considerable amount of heat, means are provided within the portable fire pit structure for absorbing part of the intense heat generated by the core of the fire, and shielding the outer foraminous walls of the fire pit from such intense heat, to thus prevent warping of such outside foraminous wall structures.

BRIEF DESCRIPTION OF THE DRAWINGS

FIG. 1 is a fragmentary plan view illustrating a portion of the portable fire pit in substantially collapsed condition.

FIG. 2 is a perspective view illustrating the portable fire pit in a partially unfolded condition.

FIG. 3 is a perspective view from the left side wall illustrating the portable fire pit in its extended position of use, a portion of the structure being broken away to decrease the size of the view.

FIG. 4 is a left side elevational view of the portable fire pit, a portion of one of the foldable foraminous wall members being broken away adjacent the front wall panel to reveal underlying structure.

FIG. 5 is a left side elevational edge view of the portable fire pit folded into a completely collapsed structure.

FIG. 6 is an enlarged fragmentary cross-sectional view taken of the area encircled by the arrow line 6 in FIG. 4.

FIG. 7 is an enlarged fragmentary cross-sectional view of the area of the structure encircled by the arrow line 7 in FIG. 5.

FIG. 8 is a left side elevational view similar to FIG. 4, but having a portion of the foldable hinged side wall broken away to reveal underlying structure particularly the means for locking and stabilization of the ash pan in position of use.

FIG. 9 is a fragmentary view similar to FIG. 8, the upper portion being broken away to reduce the size of the view, and illustrating the locking and stabilization means for retention of the ash pan shifted to its ash pan release position in preparation for removal of the ash pan.

FIG. 10 is a fragmentary view similar to FIG. 9, illustrating the manner in which the ash collection and retention pan may be detached from the structure and lowered to the ground for appropriate disposition of the ash content.

FIG. 11 is an enlarged fragmentary cross-sectional view taken of the area indicated by the arrow line 11 in FIG. 8.

FIGS. 12 is a fragmentary cross-sectional view taken in the plane indicated by the line 12—12 in FIG. 11 and showing the ash pan locking means in ash pan locking orientation.

FIG. 13 is a left side elevational view similar to FIG. 4, portions of the structure being broken away to reveal the heat deflector panel assembly mounted within the portable fire pit on the ash pan.

FIG. 14 is a fragmentary vertical plan view partially broken away, showing the placement of the heat deflector panel assembly in relation to the ash pan of the portable fire pit, shown apart from other structure.

FIG. 15 is a front elevational view of the heat deflector panel assembly shown in FIG. 14 taken in the direction of arrow 15 in FIG. 14.

FIG. 16 is a fragmentary vertical sectional view taken in the plane indicated by the line 16—16 in FIG. 13 and illustrating the detachable method of securing the heat deflector panel assembly to the ash pan within the portable fire pit.

FIG. 17 is a front elevational view of one of the two heat deflector panels adapted to be mounted parallel to the left and right side foldable wall panels and shown apart from other structure.

FIG. 18 is an end edge view of the heat deflector panel illustrated in FIG. 17.

FIG. 19 is a plan view of the ash collector and retention pan shown apart from other structure and adapted to be mounted in the lower portion of the extended portable fire pit as illustrated in FIG. 3.

FIG. 20 is a front edge elevational view of the ash collector and retention pan illustrated in FIG. 19, a portion of the peripheral flange being broken away to reveal the underlying structure.

FIG. 21 is a front elevational view of one of the two heat deflector panels adapted to be mounted on the ash pan parallel to the front and rear wall panels, shown apart from other structure.

FIG. 22 is an end elevational view of the heat deflector shield of FIG. 21.

FIG. 23 is an enlarged fragmentary cross sectional-view illustrating the manner in which the ash collection and retention pan illustrated in FIGS. 13 and 19 may be selectively secured within the bottom portion of the foldable portable fire pit structure as illustrated in FIG. 3.

DESCRIPTION OF THE PREFERRED EMBODIMENTS

In terms of greater detail, the portable fire pit of the invention comprises a structure that may be stored or transported in collapsed condition. When it is desired to use the fire pit, it may be carried to the location of use, and unfolded and extended into condition of use, whether that use be merely for building a fire in the portable fire pit for purposes of warmth and aesthetic values, or for grilling food to be consumed in addition to the aesthetic values that are projected by the portable fire pit in use.

Structurally, the portable fire pit is designated generally by the numeral 2, and comprises front and rear metallic wall panels 3 and 4, respectively, each of the metal wall panels being foraminous in nature by the provision of a multiplicity of series of holes spaced on one inch centers, the holes being approximately ¼ of an inch in diameter. Only a few of the many holes are illustrated, the positions of the remaining holes being shown by lines marking the centers of the holes. It is important to note that alternate rows of the holes are offset by approximately one-half the distance between adjacent holes. Each of the metal wall panels 3 and 4 is approximately 18-¼ inches wide in a horizontal dimension, and approximately 18 inches high in a vertical dimension perpendicular to the horizontal dimension.

Each of the metal wall panels is preferably formed from sixteen gauge low carbon cold rolled steel and is formed with a peripheral flange 6 circumscribing its outer edges on all four sides and projecting perpendicularly from the associated plate approximately one and one-half inches to thereby define a shallow pan structure, the bottom of which is formed by the associated foraminous front or rear metal wall panel 3 or 4, respectively. In the interest of brevity in this description, it should be noted that both the front and rear wall panels 3 and 4, including the circumscribing flange 6, are substantially identical in structure and, accordingly, only one of these front and rear metal wall panels will be described herein in detail, it being understood that whatever structures or qualities are attributed to one are also attributable to the other.

Each of the front and rear metal wall panels is provided with a pair of legs 7 that are generally V-shaped in configuration, formed from strap metal, and provided with flanges 8 extending in opposite directions and welded to the lower peripheral flanges 9 of the front and rear metal wall panels adjacent each of the vertical peripheral side edge flanges 11 and 12 as illustrated in FIGS. 2 and 3. It should be noted that each of the leg structures projects from the panel flange 9 to which it is welded by about 2-¾ inches, each of the legs of the pair associated with each of the metal wall panels being positioned on the lower peripheral flange 9 substantially flush with the foraminous metal wall panels 3 and 4. On the top peripheral flange 13 of each of the front and rear wall panels 3 and 4 there is provided a handle designated generally by the numeral 14 and including a grip portion, leg members, and laterally extending flange portions that are suitably welded to the top peripheral flange medianly between the vertical peripheral flanges 11 and 12, and adjacent the free edge 15 of the peripheral flange remote from the foraminous front and rear metal wall panels.

Because of the positioning of the pairs of legs 7 on each of the front and rear metal wall panels, and because of the positioning of the handles 14 on the front and rear metal wall panels, when the two front and rear metal wall panels are in folded or closely confronting position, as illustrated in FIG. 5, the pairs of legs will be spaced laterally from one another to lend stability to the structure so that it may freely stand on a flat supporting surface while the handles 14 will be more closely spaced to one another, thus permitting the two handles to be grasped by one hand so that the portable fire pit may be picked up and transported to its storage location.

Welded to the bottom of the shallow pan formed by each of the front and rear metal wall panels and the peripheral flange formed thereabout, are a pair of support brackets designated generally by the numeral 19. Each of the support brackets is welded symmetrically with respect to a plane parallel to the vertical side peripheral flanges 11 and 12, and spaced therefrom about 1-⅞ inches. The support brackets 19 are spaced upwardly from the lower peripheral flange 9 approximately 11-¾ inches, and at that dimension provide an inwardly protecting ash grate or grill support flange 21, the other leg of the L-shaped bracket lying flat against the inside surface of the metal wall panel with which it is associated and being spot-welded thereto so as to provide a rigid support bracket for supporting an ash grate on which fuel to be burned may selectively be supported when the portable fire pit is in use as a barbecue grill fueled, for instance, by charcoal briquettes.

For a purpose which will hereinafter be explained, each of the vertical peripheral flanges 11 and 12 (FIGS. 2, 3, 4 and 5 is provided with an elongated series of five apertures 22 having a diameter of about 0.213 inches and centered approximately 0.406" from the free edge of the peripheral flanges with all of the apertures lying in a common plane. Formed in the lower peripheral flanges 9 of each of the front and rear wall panels are a pair of laterally spaced apertures 23 (FIG. 23) spaced approximately 9-½ inches apart and lying equidistant on opposite sides of a median plane between the peripheral flanges 11 and 12. As with the apertures 22, the apertures 23 are spaced nearer the free edge of the flange 9 than they are to the foraminous front and rear metal wall plates or panels, and serve to receive appropriate fasteners as will be explained.

As indicated above, when the two front and rear metal wall panels, each constituting a shallow dish-shaped structure, are placed in confronting relationship as illustrated in FIGS. 1, 2 and 5, they constitute mirror images of one another, and when the free edges of the peripheral flanges 9 are closely opposed, form a shallow enclosure within which auxiliary equipment as will hereinafter be described and forming a part of the portable fire pit may be stored when the structure is in collapsed storable condition. However, to eliminate the necessity of dissassembly of the structure in order to effect a collapsed condition thereof, the portable fire pit designated generally by the numeral 2 is also provided with left and right side metallic wall panels 24 and 26, respectively. Each of these left and right metal wall panels are identical to one another, and also constitute mirror images of each other when in confronting position.

Referring to FIGS. 1 through 4, inclusive, it will there be seen that the left metal wall panel 24 is formed as a composite from two substantially identical sub-panels 27 and 28 pivotally joined along adjacent vertical edges by an elongated piano-type hinge 29. The opposite vertical side edges of the sub-panels 27 and 28 are provided with apertures along their edges that correspond in spacing to the apertures 22 formed in the peripheral flanges 11 and 12 of the front and rear metal wall panels. These corresponding apertures and appropriate cap screws or rivets form a means by which the sub-panel 27, for instance, may be pivotally mounted by a hinge 31 to the confronting edge portion of the peripheral flange portion 12 so as to thus pivotally join the foldably collapsible composite left side wall 24 to the rear metal wall panel 4.

In like manner, the opposite longitudinal and vertical edge portion of the sub-panel 28 is pivotally mounted to the peripheral flange 11 of the front metal wall panel 3 by a hinge 32 (FIGS. 1 and 2) similar to the hinge 31, thus enabling the left side composite wall panel 24 to be folded as illustrated in FIGS. 1 and 2, or to be extended as illustrated in FIG. 3 whereby the sub-panels 27 and 28 lie in a common plane as illustrated to form the left foldably collapsible wall panel 24. In like manner, the opposing sub-panels 33 and 34 that make up the right side foldable wall panel 26, are also joined to one another by a medianly positioned piano-type hinge 29, with opposite vertical edges of the sub-panels being pivotally connected to the associated peripheral flanges 11 and 12 by hinges 35 and 36, respectively, similar to the hinges 31 and 32.

It will thus be seen that with the front and rear metal wall panels 3 and 4 pivotally connected to the composite left and right foldable side wall panels 24 and 26, the portable fire pit may be unfolded or extended from the position illustrated in FIG. 5, to the successive positions illustrated in FIGS. 2 and 3. In FIG. 2, it will be seen that the portable fire pit is only partially extended, while in FIG. 3, it is seen that the portable fire pit is completely extended to form a generally box-like or cubiform structure having foraminous front, rear, left and right side walls. Thus, without more, the structure described above, defines foraminous walls about a space which, without more, can be utilized to constitute a fire pit or foraminous enclosure within which a fire can be maintained, the legs 7 resting on a suitable support surface, such as the ground, or on a concrete slab. In such form, the enclosure constitutes an article of manufacture usable in the condition illustrated in FIG. 3 for the purpose stated.

However, it is preferred that the portable fire pit of the invention be provided with auxiliary structures that make the portable fire pit more widely usable, for instance, in backyard patios or open congregation areas where a group of people might assemble for supper, conviviality and comradery. Accordingly, in one preferred form, the structure as illustrated in FIGS. 1 through 7, is provided with an ash collector and retention pan designated generally by the numeral 37 and illustrated in plan in FIG. 19. The ash collector and retention pan is nominally about one inch in depth, having a bottom wall 38, surrounded peripherally by a flange 39. In the embodiment illustrated in FIGS. 1 through 7, the ash collector and retention pan 37 is pivotally hinged to the lower peripheral flange 9 of the front metal wall panel 3, as illustrated in FIG. 6, by hinge 41, one leaf of which is spot welded to the underside surface of the bottom 38 of the pan, while the opposite leaf of the hinge is spot welded to the peripheral flange 9 on its inner surface. While spot welding is preferred, other means may be utilized to retain these elements in assembled condition. As illustrated in FIG. 7, when the ashes have been disposed of after use and it is desired to collapse the portable fire pit, the ash pan 37 may be pivoted upwardly so that it lies parallel to the foraminated front metal wall panel 3 as illustrated.

As illustrated in FIG. 19, the ash pan 37 is preferably substantially square in its configuration, being formed from 14 gauge low carbon cold rolled steel, including the peripheral flange 39. Formed on the upper edge of the peripheral flange 39 are inwardly projecting flanges 42 forming handles which may be grasped by a user to tilt the ash pan to raise it into its elevated position as illustrated in FIG. 7. It will thus be seen that when the ash pan 37 is deployed horizontally within the enclosure as illustrated in FIG. 3, the lateral edges of the ash pan are supported on the inwardly projecting lower flanges 9 of the front and rear metal wall panels and the substantially similar flanges formed on the bottom edges of the left and right wall panels 24 and 26. In this position, the rectilinear rigid configuration of the ash collector pan functions to retain the foraminous walls of the surrounding structure in its extended form. To emphasize the rigidity between the ash collector pan 37 and the foraminous surrounding walls of the portable fire pit, suitable apertures 43 are formed in the bottom plate 38 of the ash pan 37, and when the ash pan is deployed into its horizontal position resting on the inwardly projecting lower flanges of the front, rear and foldable left and right side metal wall panels of the portable fire pit, suitable bolts 44 are inserted through the apertures 43, and secured by suitable wing nuts 46. The use of wing nuts is preferred because it facilitates detachment of the ash pan from the underlying flanges of the side wall structure, and in the embodiment illustrated in FIGS. 6 and 7, enables the ash pan, after removal of the bolts 44 to be tilted into its vertical position in preparation for collapse of the structure for storage purposes.

Also provided in the bottom 38 of the ash pan as illustrated in FIG. 19, are a multiplicity of slots formed in the bottom 38 adjacent each of the peripheral edges. Thus, referring to FIG. 19, it will be seen that associated with the front and rear edges of the pan there shown, there are provided two elongated slots 47 and 48 lying in a common plane and equally spaced from the associated peripheral flange 39 of the ash pan. Additionally, the slots 47 and 48, are spaced symmetrically on opposite sides of a median plane that extends medianly through the handles 42. In like manner, associated with the opposite edge of the ash pan as illustrated in FIG. 19, two additional slots 49 and 51 are provided, both also lying in a common plane parallel to the plane of the associated and adjacent peripheral flange 39, and parallel to the plane of the slots 47 and 48. The slots 49 and 51 are equally spaced on opposite sides of a vertical plane passing medianly through the handles 42 on opposite edges of the ash pan.

Again referring to FIG. 19, it will be noted that the ash pan bottom 38 is also provided with two sets of elongated slots formed adjacent the side edges of the ash pan. One such set includes elongated slots 52, 53 and 54, the slots being spaced apart laterally at different distances, and the individual slots being of different lengths. It should be noted that these slots 52–54 are also spaced inwardly from the associated peripheral flange 39 of the ash pan, and lie in a common plane perpendicular to the plane of the slots 47–48 and 49/51. Referring to the upper edge of the ash pan as illustrated in FIG. 19, it will be seen that the second group or set of aligned and elongated slots 56, 57 and 58 provided in the bottom 38 of the ash pan slots have essentially the same length and the same spacing as the slots 52, 53 and 54, but are reversed in their orientation. Stated in other words, the slot 56 is equivalent to the slot 52, the slot 57 is equivalent to the slot 53, and the slot 58 is equivalent to the slot 54. In addition to the slots described above, two additional slots 61 and 62 are formed in the bottom, these two slots being aligned with each other as illustrated, and being spaced closer to the left rear edge of the pan as illustrated in FIG. 19 than to the right front edge of the pan as illustrated in FIG. 19. Also, the slot 61 is formed in the bottom 38 inboard from the slots 57 and 58, and substantially spaced medianly therebetween. On the other hand, the slot 62 is in a plane common to the slot 61 that lies parallel to the edge flange 39 and to the plane of the slots 47 and 48, and lies inboard of the perpendicularly oriented slots 52 and 53 as shown. The purpose of these slots 61 and 62 will be described hereinafter.

The purpose of the groups of slots arranged in association with the front and rear edges of the ash pan 38 is to enable the detachable mounting of a set of two metallic heat deflector plates as illustrated in FIG. 21 where the heat deflector plate is designated generally by the numeral 63, and to accommodate a set of two metallic heat deflector plates as illustrated in FIG. 17, each of which is designated generally by the numeral 64. Referring first to the heat deflector plate 63 as illustrated in FIG. 21, it will be noted that this plate is elongated in a horizontal dimension, generally having a length approximately twice its height, and is provided with a pair of projecting tab portions 66 and 67 that extend beyond the bottom edge 68 of the heat deflector plate. Appropriate apertures 69 are formed in a multiplicity of elongated and parallel series vertically spaced as shown so as to provide a multiplicity of apertures in the heat deflector plate. Additionally, associated with the left and right edges 71 and 72, respectively, are a pair of slots 73 and 74. The slots 73 and 74 extend substantially half way through the height of the plate 63. Two such plates 63 are provided, each being a mirror image of the other, one such plate, such as the plate 63, being adapted to be mounted on the ash collector pan 38 by insertion of the tab projections 66 and 67 into the elongated slots 47 and 48 formed adjacent the left rear edge of the ash pan as illustrated in FIG. 19. The second plate of the set is identical to the plate 63 and is mounted so that its tab projections 66 and 67 penetrate the elongated slots 49 and 51 associated with the right front edge of the ash pan as illustrated in FIG. 19.

The set of two heat deflector plates 64, one of which is illustrated in FIG. 17, are also formed from 13 gauge low carbon cold rolled steel as are the plates 63, and like the plates 63, two such plates 64 are provided but in the interest of brevity in this description and in the drawings, only one of each of the plates is illustrated in FIG. 17. It is to be understood that two of each of the plates 63 and 64, each being a mirror image of its corresponding mate, are provided in this invention.

Referring to the heat deflector plate 64 as illustrated in FIG. 17, it will be seen that this plate also is provided with a lower edge 76 from which project first, second and third tab projections 77, 78 and 79, respectively, each of the projections 77 and 79 being provided additionally with an aperture 80 near its bottom edge for a purpose which will hereinafter be explained. Additionally, the heat deflector plate 64 is provided with a left edge 81, a right edge 82, a top edge 83 and a plurality of apertures 84 arranged in a plurality of spaced elongated series parallel to each other and which extend for substantially the length and width of the plate. Formed in the plate commencing at the lower edge 76 are a pair of slots 86 and 87, each of the slots being adjacent associated end edges of the plate, and each of the slots terminating medianly half-way through the height of the plate.

It is important to note that as compared with the plate 63 as illustrated in FIG. 21, the slots 73 and 74 in that plate extend from the top edge 70 downwardly to a median plane through the plate. It is also important to note that when the plates 63 are mounted on the ash pan bottom 38, the projecting tabs 66 and 67 extend through the apertures 47–48 and 49/51 to the maximum extent so that the lower edges 68 of the plates 63 rest on the inner surface of the bottom 38 of the ash collector pan. In like mariner, when the tab projection 77, 78 and 79 are inserted into the correspondingly positioned elongated slots 52, 53 and 54, (and elongated slots 56, 57, and 58) the bottom edges 76 of the plates 64 impinge on the inner surface of the bottom 38 of the ash pan, and the plates 64 extend perpendicular to the plates 63.

Additionally, the slots 86 and 87 in the deflector plates 64 coincide with the slots 73 and 74 in the plates 63 and extend below such slots to engage the body of the plates 63, causing the plates 63 and 64 to be detachably interlocked one with the other to form a four-sided heat deflecting fence or shield spaced inwardly from the outer foraminous walls of the portable fire pit, thus providing an air space between the back sides of the heat deflector plates and the inner surfaces of the side walls around the interior of the cubicle as illustrated in FIG. 13. This assembly is also illustrated in assembled form in plan in FIG. 14, and in front elevation in FIG. 15.

To detachably retain the assembled heat deflector shield plates secured within the portable fire pit, it will be noted that the projecting tabs 77 and 79 of heat shield plates 84 (FIG. 17) are provided with apertures 80, project below the bottom surface of the bottom 38 of the ash pan, (FIG. 16) and are detachably locked to the bottom 38 by a quick release fastener designated generally by the numeral 88 (FIGS. 15 and 16), which includes a looped end 89 through which a finger may be extended to withdraw the straight shank 91 from the aperture 80 through which it penetrates. It will thus be seen that with the heat deflector plate 63 and 64 arranged on and secured to the ash pan 37 as described above, and with the ash pan per se being secured by the bolts 44 to the inwardly extending flanges of the front, rear and side walls of the portable fire pit when in extended position as illustrated in FIG. 3, the interconnection of the ash pan 37 with the side walls of the portable fire pit rigidify the entire structure so as to eliminate any possibility that the structure may be inadvertently or intentionally collapsed during use.

Additionally, as previously stated, the deflector plates 63 and 64 arranged as illustrated in FIG. 14 in plan, provide an air space 92 on all sides of the assembled ash pan and heat deflector plates, thus minimizing the more intense heat that is generated within the confines of the heat deflector plates from being transmitted to the outer foraminous walls of the portable fire pit, thus preventing such walls from being degraded through warpage. It should be understood that the tolerances between the outer enclosing foraminous cubicle formed by the foraminous walls of the portable fire pit and the ash pan and detachably secured heat deflector plates 63 and 64 are such as to permit expansion and contraction of the metal parts without imposing stress on any part.

With the heat deflector structure thus assembled on the ash pan, a fuel support grate 93 may be lowered from above onto the inwardly projecting upper leg 21 of the support bracket 19 welded to the inner surface of each of the front and rear metal wall panels 3 and 4 as illustrated in FIG. 4. The grill 93 is preferably itself foraminous, and may be formed as is common from stainless steel, or chrome-plated cold rolled steel, having an outer perimeter frame that fits within the interior confines of the cubicle space defined by the foraminous side walls of the portable fire pit, with cross braces or rods arranged in parallelism between side members of the perimeter frame so that as fuel placed on the support grate or ash grill, as it might be called, and continues to burn, ashes that are formed fall through the ash grate and onto the ash collector and retention pan 37 as previously described.

Additionally, where it is desired to cook or grill food, a cooking grill 94 is provided detachably supported on the top inwardly projecting flanges of the front and rear wall panels, the cooking grill being constructed similarly to the ash grate, yet having parallel bars that form the grill that are spaced sufficiently wide to permit the passage of the handles 14 on opposite front and rear metal wall panels as illustrated in FIG. 4, to thus retain the grill on the structure and spaced above the fuel or ash grate 93 sufficiently to enable cooking of food, such as the hot dogs 96, on the cooking grill obviously, where it is desirable that the transverse rods that form the cooking grill need to be more closely spaced than would permit the passage of the handles 14 between the rods, suitable opposed notches (not shown) may be provided in the cooking grill to accommodate the handles 14.

In the embodiment of the invention illustrated in FIGS. 8 through 12, the difference in structure is the manner in which the ash pan 37 is retained in the bottom portion of the portable fire pit structure, so that it may be more easily manipulated in order to give access with greater facility to the heap of ashes 95 that have been collected thereon as illustrated in FIGS. 8–10. Referring therefore to FIG. 19, which shows the generally rectangular or square configuration of the ash collector and retention pan 37, in this embodiment, the dimensions are slightly altered to permit the ash pan to be lowered through the extended side walls of the portable fire pit, and rest on the lower flanges of the front and rear side wall panels. Dimensionally, the ash pan 37 rests on the flanges 9 as illustrated in FIG. 8, and its position thereon is immobilized by a lock mechanism designated generally by the numeral 97.

As indicated previously, the ash pan 37 is provided with a bottom 38 and a peripheral flange 39 that gives the ash pan some depth to retain the ashes that fall therein, and which is now used in conjunction with the lock mechanism 97 to immobilize the ash pan once it is placed in the lower portion of the portable fire pit. Thus, as illustrated in FIGS. 8, 11 and 12, the lock mechanism 97 includes a stop plate 98 constituting a flange projecting perpendicularly and integrally from a mounting plate 99 that is securely mounted on a pin shaft 101 for rotation therewith, such rotation effected by a handle 102.

In the position illustrated in FIGS. 8, 11 and 12, the edge of the stop plate 98 abuts the flange 39 of the ash pan and retains it against lateral movement. The stop plate 98 is provided with an aperture having a serrated inner periphery that may be pressed onto the outer periphery of the shaft 101 to lock the mounting plate 99 onto the rotatable pin shaft 101. The rotatable pin shaft 101 penetrates through an aperture in the lower portion of the front or rear wall panels, preferably the rear wall panel, and includes a bearing member 103 one end of which is welded to the handle 102 and the opposite end of which bears rotatably against the outer surface of the rear wall panel 4. In most instances, one such lock mechanism has been found to be sufficient, but two such lock mechanisms are preferred to eliminate any possibility of the ash pan 37 shifting within the structure once the lock mechanisms have been placed in the locking attitude illustrated in FIGS. 8, 11 and 12.

After use of the portable fire pit, when it is desired to fold the structure for storage or transport, the grills 93 and 94 are removed to provide access to the interior of the structure, and the heat deflector shield plates are removed from the ash pan. The handles 102 of the lock mechanisms are now rotated to re-orient the stop plates 98 so that they are now in a horizontal position and lie in a common plane above the ash pan 37. With the lock plates so re-positioned, the ash pan may now be moved to the left as indicated by the arrow A illustrated in FIG. 9, thus enabling the right edge of the ash pan to drop to the ground or other surface as illustrated by arrow B in FIG. 10. The ash pan, with its right edge now resting on the ground or other surface, is now moved to the right as illustrated by arrow C in FIG. 10, so that the left end or edge of the ash pan may now drop to the ground as illustrated by arrow D and rest in that position, while the remainder of the portable fire pit is lifted away from the ash pan.

The ash pan may now be cleaned by removal and disposal of the ashes in whatever way is appropriate. Preferably, the ashes are placed in a fire proof container and disposed of by placement in a waste receptacle of the type that is provided in most National forest areas and State parks and camping grounds and beach areas, or even in a residential garbage container.

To fold or collapse the portable fire pit of the embodiment illustrated in FIGS. 4–7 wherein the ash pan is pivotally mounted to the front wall panel 3 by hinge 41, after removal of the ashes from the ash pan, the heat deflector plates are lain flat on the ash pan and the ash pan is pivoted upwardly into the position illustrated in FIG. 7 wherein the ash pan lies parallel to the front wall panel 3, and the heat deflector plates lie in the space between the ash pan and the front wall 3 of the structure. In this position, the support flanges 21 (FIG. 4) penetrate through slots 61 and 62 formed in the bottom of the ash pan. Next, the grills 93 and 94 are lowered edgewise through the open top of the still extended portable fire pit, and placed in parallel relationship with the rear wall panel 4, actually resting on the inside surface of the lower flange 9 and the inside surface of the associated wall panel 4. The composite hinged left and right side walls of the structure are now caused to pivot inwardly as illustrated in FIG. 2, until the front and rear metal wall panels are placed in closely spaced opposing position as illustrated in FIG. 5, with all of the pertinent equipment enclosed within the now collapsed structure.

With the embodiment of the invention illustrated in FIGS. 8-12, the ash pan, not being pivoted to the front wall panel 3 as in FIG. 7 is, after removal of the ashes, lowered edge first through the extended open top of the structure until the short slots 61 and 62 in the ash pan come into registry with the support flanges 21 of brackets 19 welded to the inside surface of either the front or rear wall panel 3 or 4. When the slots 61 and 62 are placed in registry with the ash grate support flanges 21, the support flanges penetrate the slots 61 and 62, and the ash pan thus lies suspended on the inwardly projecting flanges 21 of the ash grate brackets. The heat deflector plates 63 and 64 and the grills 93 and 94 are supported on the bottom flange 9 of the opposing rear wall panel 4. The lock pins 88 (FIG. 16) and the wing nuts 46 and bolts 44, (FIG. 23) having previously been removed, are stored in an appropriate container for future re-use.

With all of the pertinent equipment thus stored in a parallel relationship within the extended condition of the portable fire pit the hinged and pivoted left and right side walls 24 and 26, respectively, may now be collapsed inwardly as illustrated in FIG. 2, and ultimately placed in the relationship illustrated in FIG. 5 wherein all of the equipment is contained within the confines of the front and rear wall panels of the portable fire pit. The collapsed structure may now be placed in a container, or may be banded with an appropriate strap to prevent its inadvertent extension until it is desired to use the structure again as a fire pit. Thus, it may remain in storage in the condition illustrated in FIG. 5 for an indefinite period, until it is desired to re-establish the fire pit in its extended attitude illustrated in FIG. 3.

Thus, to extend the portable fire pit for use from the collapsed condition illustrated in FIG. 5 to the extended condition illustrated in FIG. 3, all that is required is that the front and rear wall panels 3 and 4 be separated from each other, thus causing the pivoted and hinged left and right side wall panels 24 and 26 to extend themselves into the position illustrated in FIG. 3, whereupon the cooking grill and the fuel support grate or grill may be removed from the interior of the structure, the heat deflection plates 63 and 64 may be removed from the interior of the structure, and the ash pan 37 reoriented so that it now lies on the lower flanges of the front and rear side wall panels and the left and right side wall panels, and either locked in place with the bolts and wing nuts illustrated in FIG. 23, or retained in an immobile position with the alternate structure illustrated in FIGS. 8-12. In either case, the ash pan is immobilized, and thereafter, the pairs of heat deflector plates 63 and 64 may be mounted on the ash pan, it being noted that the heat deflector plates 63 are first mounted in the slots 47-48 and 49/51 which correlate with the front and rear wall panels 3 and 4, respectively, of the portable fire pit. Thereafter, the pair of plates 64 are lowered into position so that the slots 86 and 87 coincide with the slots 73 and 74 of the perpendicularly related heat deflector plates 63, the slots 86 and 87 dropping below the slots 73 and 74 in order to lock the four sides of the heat deflector assembly into an integrated or composite structure within which the nucleus of a fire may be contained and which functions to shield the side walls 3, 4, 24 and 26 from the direct heat radiated from the core of the fire.

It will of course be understood that when the portable fire pit is used in the manner just described to provide a fire within the enclosure that is contained within the cubicle formed by the heat deflector plates 63 and 64, the ash grate or grill 93 that may be supported on the support brackets 19 may be used as a spark arrestor rather than a fuel support grate and supported on the top of the fire pit in place of the grill 94. Alternatively, the grill 93 may be removed from the assembly, and food to be cooked may be supported on the grill 94 supported on the top surface of the portable fire pit. Alternatively, the grill 93 may support fuel, such as briquettes of the type that are commonly used for outdoor barbecues (FIG. 4), whereupon the ash from such briquettes, as they are consumed, will fall into the ash pan 37. In this alternative, the grill 94 is utilized for cooking food to be barbecued.

Having thus described the invention, what is believed to be new and novel, and sought to be protected by Letters Patent of the United States is as follows.

I claim:

1. A portable collapsible fire pit amendable to portability and storage in collapsed condition and susceptible to selective extension for use in a selected location as either a fire pit or a barbecue grill, comprising:
    a) a four-sided housing having front, rear, left and right side wall selectively defining and enclosing on four sides a cubicle space within which flammable fuel may be disposed and ignited to generate flames;
    b) two of said four side walls of the housing comprising unitary quadrilateral front and rear parallel metallic panels confronting one another and having top, bottom, left and right edge portions;
    c) the remaining left and right side walls each comprising a pair of quadrilateral metallic side wall panel portions pivotally connected to one another and selectively movable between a collapsed condition in which said side wall panel portions of each pair are parallel to one another and an extended condition in which said side wall panel portions lie in a common plane, corresponding side wall portions of each said pair thereof pivotally connected to said left and right edge portions of said confronting front and rear metallic panels;
    d) whereby said first mentioned front and rear metallic wall panels may be selectively movable between a collapsed condition in which said front and rear parallel metallic panels and said pairs of pivotally connected side wall panel portions lie in relatively close parallel juxtaposition, and an extended condition in which said front and rear parallel panels lie spaced apart a distance correlated to the extended width of said pairs of pivotally connected side wall panel portions each of which in extended condition lie perpendicular to said front and rear wall panels;
    e) said front and rear side wall metallic panels including mutually reaching mounting flanges on their top, bottom, left and right edge portions; and f) a food supporting foraminous grilling rack detachably mounted on the top mounting flanges of said front and rear side wall panels when said housing is in extended position of use.

2. A portable collapsible fire pit amenable to portability and storage in collapsed condition and susceptible to selective extension for use in a selected location as either a fire pit or a barbecue grill, comprising:
   a) a four-sided housing having front, rear, left and right side walls selectively defining and enclosing on four sides cubicle space within which flammable fuel may be disposed and ignited to generate flames;
   b) two of said four side walls of the housing comprising unitary quadrilateral front and rear parallel metallic panels confronting one another and having top, bottom, left and right edge portions;
   c) the remaining left and right side walls each comprising a pair of quadrilateral metallic side wall panel portions pivotally connected to one another and selectively movable between a collapsed condition in which said side wall panel portions of each pair are parallel to one another, and an extended condition in which said side wall panel portions lie in a common plane, corresponding side wall portions of each said pair thereof pivotally connected to said left and right edge portions of said confronting front and rear metallic panels;
   d) whereby said first mentioned front and rear metallic wall panels may be selectively movable between a collapsed condition in which said front and rear parallel metallic panels and said pairs of pivotally connected side wall panel portions lie in relatively close parallel juxtaposition, and an extended condition in which said front and rear parallel panels lie spaced apart a distance correlated to the extended width of said pairs of pivotally connected side wall panel portions each of which in extended condition lie perpendicular to said front and rear wall panels;
   e) said front and rear side wall metallic panels including mutually reaching mounting flanges on their top, bottom, left and right edge portions; and
   f) handles are mounted on the top mounting flanges of said front and rear side wall panels.

3. A portable collapsible fire pit amenable to portability and storage in collapsed condition and susceptible to selective extension for use in a selected location as either a fire pit or a barbecue grill, comprising:
   a) a four-sided housing having front, rear, left and right side walls selectively defining and encasing on four sides a cubicle space within which flammable fuel may be disposed and ignited to generate flames;
   b) two of said four side walls of the housing comprising unitary quadrilateral front and rear parallel metallic panels confronting one another and having top, bottom, left and right edge portions;
   c) the remaining left and right side walls each comprising a pair of quadrilateral metallic side wall panel portions pivotally connected to one another and selectively movable between a collapsed condition in which said side wall panel portions of each pair are parallel to one another and an extended condition in which said side wall panel portions lie in a common plane, corresponding side wall portions of each said pair thereof pivotally connected to said left and right edge portions of said confronting front and rear metallic panels;
   d) whereby said first mentioned front and rear metallic wall panels may be selectively movable between a collapsed condition in which said front and rear parallel metallic panels and said pairs of pivotally connected side wall panel portions lie in relatively close parallel juxtaposition, and an extended condition in which said front and rear parallel panels lie spaced apart a distance correlated to the extended width of said pairs of pivotally connected side wall panel portions each of which in extended condition lie perpendicular to said front and rear wall panels;
   e) said front and rear side wall metallic panels including mutually reaching mounting flanges on their top, bottom, left and right edge portions; and
   f) a plurality of housing support leg structures mounted on said bottom mounting flanges of said front and rear side wall panels.

4. A portable collapsible fire pit amenable to portability and storage in collapsed condition and susceptible to selective extension for use in a selected location as either a fire pit or a barbecue grill, comprising:
   a) a four-sided housing having front, rear, left and right side walls selectively defining and enclosing on four sides a cubicle space within which flammable fuel may be disposed and ignited to generate flames;
   b) two of said four side walls of the housing comprising unitary quadrilateral front and rear parallel metallic panels confronting one another and having top, bottom, left and right edge portions;
   c) the remaining left an right side walls each comprising a pair of quadrilateral metallic side wall panel portions pivotally connected to one another and selectively movable between a collapsed condition in which said side wall panel portions of each pair are parallel to one another and an extended condition in which said side wall panel portions lie in a common plane, corresponding side wall portions of each said pair thereof pivotally connected to said left and right edge portions of said confronting front and rear metallic panels;
   d) whereby said first mentioned front and rear metallic wall panels may be selectively movable between a collapsed condition in which said front and rear parallel metallic panels and said pairs of pivotally connected side wall panel portions lie in relatively close parallel juxtaposition, and an extended condition in which said front and rear parallel panels lie spaced apart a distance correlated to the extended width of said pairs of pivotally connected side wall panel portions each of which in extended condition lie perpendicular to said front and rear wall panels;
   e) means are provided supported on at least said front and rear metallic wall panels when in extended position for catching and retaining ashes from expended fuel; and
   f) said means for catching and retaining ashes comprises a quadrilateral pan including a metallic bottom plate circumscribed by an integral perpendicular flange, and a metal heat deflector assembly detachably mounted on said metallic bottom plate spaced from said circumscribing integral perpendicular flange.

5. A portable collapsible fire pit amenable to portability and storage in collapsed condition and susceptible to selective extension for use in a selected location as either a fire pit or a barbecue grill, comprising:
   a) a four-sided housing having front, rear, left and right side walls selectively defining and enclosing an four sides a cubicle space within which flammable fuel may be disposed and ignited to generate flames;
   b) two of said four side walls of the housing comprising unitary quadrilateral front and rear parallel metallic panels confronting one another and having top, bottom, left and right edge portions;

c) the remaining left and right side walls each comprising a pair of quadrilateral metallic side wall panel portions pivotally connected to one another and selectively movable between a collapsed condition in which said side wall panel portions of each pair are parallel to one another and an extended condition in which said side wall panel portions lie in a common plane, corresponding side wall portions of each said pair thereof pivotally connected to said left and right edge portions of said confronting front and rear metallic panels;

d) whereby said first mentioned front and rear metallic wall panels may be selectively movable between a collapsed condition in which said front and rear parallel metallic panels and said pairs of pivotally connected side wall panel portions lie in relatively close parallel juxtaposition, and an extended condition in which said front and rear parallel panels lie spaced apart a distance correlated to the extended width of said pairs of pivotally connected side wall panel portions each of which in extended condition lie perpendicular to said front and rear wall panels;

e) an ash catching and retention pan pivotally mounted on the lower edge portion of one of said front or rear metallic wall panels and selectively deployable between an extended position of use in which said ash pan lies perpendicular to said side walls and a retracted position for storage in which said ash pan lies parallel to the side wall on which it is pivotally mounted; and f) said ash catching and retention pan including a quadrilateral metallic bottom plate circumscribed by an integral perpendicular flange, and a metallic heat deflector assembly detachably mounted on said metallic bottom plate spaced from said circumscribing integral perpendicular flange.

6. A portable collapsible fire pit amenable to portability and storage in collapsed condition and susceptible to selective extension for use in a selected location as either a fire pit or a barbecue grill, comprising:

a) a four-sided housing having front, rear, left and right side walls selectively defining and enclosing on four sides a cubicle space within which flammable fuel may he disposed and ignited to generate flames;

b) two of said four side walls of the housing comprising unitary quadrilateral front and rear parallel metallic panels confronting one another and having top, bottom, left and right edge portions;

c) the remaining left and right side walls each comprising a pair of quadrilateral metallic side wall panel portions pivotally connected to one another and selectively movable between a collapsed condition in which said sidewall panel portions of each pair are parallel to one another and an extended condition in which said side wall panel portions lie in a common plane, corresponding side wall portions of each said pair thereof pivotally connected to said left and right edge portions of said confronting front and rear metallic panels;

d) whereby said first mentioned front and rear metallic wall panels may be selectively movable between a collapsed condition in which said front and rear parallel metallic panels and said pairs of pivotally connected side wall panel portions lie in relatively close parallel juxtaposition, and an extended condition in which said front and rear parallel panels lie spaced apart a distance correlated to the extended width of said pairs of pivotally connected side wall panel portions each of which in extended condition lie perpendicular to said front and rear wall panels;

e) means provided supported on at least said front and rear metallic wall panels when in extended position for catching and retaining ashes from expended flammable fuel;

f) a metallic heat deflector assembly detachably mounted on said means for catching and retaining ashes; and g) said metallic heat deflector assembly comprising a first pair of generally rectangular plates spaced apart and mounted adjacent said front and rear side metallic panels, and a second pair of generally rectangular plates spaced apart and mounted adjacent said left and right side wall panels, the plates of said second pair perpendicularly and detachably interlocking with the first pair to form a rectangular box-like receptacle spaced from the associated side walls of said housing to provide an air gap therebetween.

7. The portable collapsible fire pit according to claim 6, wherein front, rear, left and right side wall panels of said housing are foraminous, and said first and second pairs of rectangular heat deflector plates are foraminous.

8. The portable collapsible fire pit according to claim 6, wherein said means for catching and retaining ashes includes a quadrilateral pan including a metallic bottom plate circumscribed by an integral perpendicular flange, said metallic bottom plate including at least two slots adjacent opposite left and right edge portions thereof, said second pair of generally rectangular plates each including a bottom edge adapted to impinge on said metallic bottom plate of the ash pan and including at least one integral tab projecting from said bottom edge and projecting through an associated one of said two slots formed in the bottom of the ash pan to provide an apertured tab portion accessible from the opposite side of the bottom of the ash pan, and means detachably engaging the apertures in said projecting tab portions to detachably lock said assembly of metallic heat deflector plates to said ash pan.

9. The portable and collapsible fire pit according to claim 8, wherein said first pair of generally rectangular plates each includes a bottom edge adapted to impinge on said metallic bottom plate of the ash pan and includes at least one integral tab projecting from said bottom edge, at least one slot formed in said bottom plate associated with said at least one integral tab whereby said associated tab projects through said slot to retain the heat deflector plate from which the tab projects against lateral displacement in relation to said bottom plate of the ash pan.

10. A portable collapsible fire pit amenable to portability and storage in collapsed condition and susceptible to selective extension for use in a selected location as either a fire pit or a barbecue grill, comprising:

a) a four-sided housing having front, rear, left and right side walls selectively defining and enclosing on four sides a cubicle space within which flammable fuel may be disposed and ignited to generate flames;

b) two of said four side walls of the housing comprising unitary quadrilateral front and rear parallel metallic panels confronting one another and having top, bottom, left and right edge portions;

c) the remaining left and right side walls each comprising a pair of quadrilateral metallic side wall panel portions pivotally connected to one another and selectively movable between a collapsed condition in which said side wall panel portions of each pair are parallel to one another and an extended condition in which said side wall panel portions lie in a common plane, corresponding side wall portions of each said pair thereof pivotally connected to said left and right edge portions of said confronting front and rear metallic panels;

d) whereby said first mentioned front and rear metallic wall panels may be selectively movable between a collapsed condition in which said front and rear parallel metallic panels and said pairs of pivotally connected side wall panel portion lie in relatively close parallel juxtaposition, and an extended condition in which said front and rear parallel panels lie spaced apart a distance correlated to the extended width of said pairs of pivotally connected side wall panel portions each of which in extended condition lie perpendicular to said front and rear wall panels;

e) front and rear side wall metallic panels including mutually reaching mounting flanges on their top, bottom, left and right edge portions; and f) means interposed between said means for catching and retaining ashes and said mutually reaching bottom mounting flanges for retaining said means for catching and retaining ashes against relative movement in relation to at least front and rear side wall panels to thus rigidify the housing.

* * * * *